United States Patent
Hopfauf et al.

(10) Patent No.: US 11,970,846 B2
(45) Date of Patent: Apr. 30, 2024

(54) FITTING HAVING PULL-OUT HOSE

(71) Applicant: GROHE AG, Hemer (DE)

(72) Inventors: Harry Hopfauf, Soest (DE); Stefan Steinhoff, Sundern (DE)

(73) Assignee: GROHE AG, Hemer (DE)

( * ) Notice: Subject to any disclaimer, the term of this patent is extended or adjusted under 35 U.S.C. 154(b) by 401 days.

(21) Appl. No.: 17/312,129

(22) PCT Filed: Feb. 4, 2020

(86) PCT No.: PCT/EP2020/052708
§ 371 (c)(1),
(2) Date: Jun. 9, 2021

(87) PCT Pub. No.: WO2020/173672
PCT Pub. Date: Sep. 3, 2020

(65) Prior Publication Data
US 2022/0042289 A1    Feb. 10, 2022

(30) Foreign Application Priority Data
Feb. 26, 2019    (DE) .................. 10 2019 104 773.0

(51) Int. Cl.
*E03C 1/04*    (2006.01)
*F16K 11/00*   (2006.01)
(Continued)

(52) U.S. Cl.
CPC ........ *E03C 1/0404* (2013.01); *F16K 11/163* (2013.01); *F16K 19/006* (2013.01);
(Continued)

(58) Field of Classification Search
CPC .......... E03C 1/0404; E03C 2001/0415; F16K 11/163; F16K 19/006; F16K 27/0263; F16K 31/52416; F16K 31/5245
See application file for complete search history.

(56) References Cited

U.S. PATENT DOCUMENTS 5,349,987 A * 9/1994 Shieh .............. E03C 1/0403
239/588
5,730,173 A * 3/1998 Sponheimer ......... E03C 1/108
137/218
(Continued)

FOREIGN PATENT DOCUMENTS

| DE | 203 12 478 | 10/2003 |
| JP | 60-37468 | 2/1985 |
| WO | 2016/118529 | 7/2016 |

OTHER PUBLICATIONS

International Search Report issued Apr. 30, 2020, in International (PCT) Application No. PCT/EP2020/052708.

*Primary Examiner* — Patrick C Williams
(74) *Attorney, Agent, or Firm* — Wenderoth, Lind & Ponack, L.L.P.

(57) ABSTRACT

A fitting (1), at least comprising a housing (2) having a housing wall (3), a mixing cartridge (4), arranged in the housing (2), having a first feed connection (5), a second feed connection (6), a mixing region (7) for mixing a fluid flowing into the mixing region (7) via the feed connections (5, 6), and an outlet connection (8) via which the fluid can flow out of the mixing region (7) and out of the mixing cartridge (4); an actuation unit (9) for actuating the mixing cartridge (4) and a hose (10); the hose (10) being connected to the outlet connection (8) by means of a first end (11) and being arranged in a moveable manner on the housing (2) by means of a second end (12); the hose (10) extending through a channel (13) of the mixing cartridge (4), the mixing region (7) being arranged at least partially between the channel (13) and the housing wall (3).

9 Claims, 4 Drawing Sheets

Figure 1:
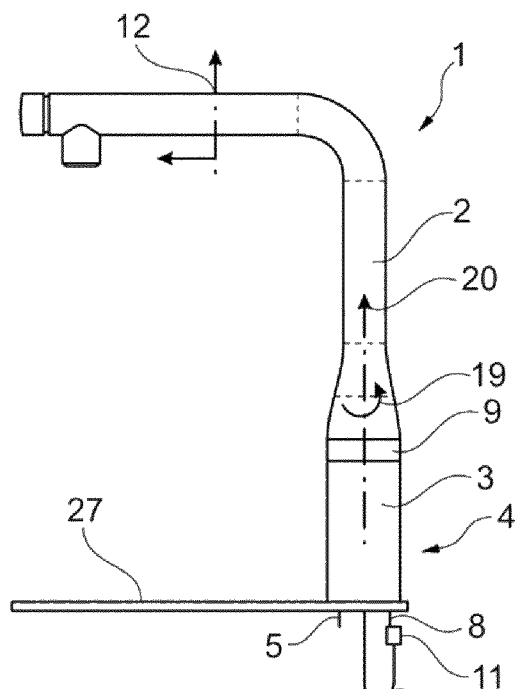

(51) Int. Cl.
*F16K 11/16* (2006.01)
*F16K 27/02* (2006.01)
*F16K 31/524* (2006.01)

(52) U.S. Cl.
CPC .... *F16K 27/0263* (2013.01); *F16K 31/52416* (2013.01); *F16K 31/5245* (2013.01); *E03C 2001/0415* (2013.01)

(56) References Cited

U.S. PATENT DOCUMENTS

| | | | |
|---|---|---|---|
| 10,234,049 B1* | 3/2019 | He | F16K 31/605 |
| 2004/0010848 A1* | 1/2004 | Esche | E03C 1/04 |
| | | | 4/675 |
| 2017/0059051 A1* | 3/2017 | Chiu | E03C 1/0412 |

* cited by examiner

FITTING HAVING PULL-OUT HOSE

The invention relates to a sanitary fitting having a pull-out hose or to a so-called pull-out fitting. The fitting can be fastened to, for example, a sanitary facility, for example a washbasin, a bathtub or the like. The fitting is in particular a mixer tap or a water faucet.

Pull-out fittings are characterized in that a fluid outlet is arranged in a moveable manner on the fitting. Accordingly, a fluid outlet is connected to the fitting via a hose, wherein the hose is arranged inside the fitting or can be pulled out of the fitting and retracted into the same.

WO2016/118529 discloses such a fitting. A single lever tap positioned laterally on the fitting housing is typically used in pull-out fittings. This is necessary because of the passing of the hose through the fitting housing. The installation space displaced by the hose makes it very difficult to accommodate a mixing valve directly inside the fitting. In WO2016/118529, the mixing valve is arranged at a distance from the housing of the fitting.

The object of this invention is that of at least partially solving the problems mentioned with regard to the prior art. In particular, a fitting of more compact design is to be proposed.

A fitting having the features according to claim 1 contributes toward achieving these objects. Advantageous developments are the subject matter of the dependent claims. The features listed individually in the claims can be combined with one another in a technologically useful manner and can be supplemented by explanatory facts from the description and/or details from the figures, wherein further embodiment variants of the invention are shown.

A fitting is proposed, at least having:
- a housing having a housing wall,
- a mixing cartridge arranged in the housing and having
  - a first feed connection, a second feed connection, a mixing region for mixing a fluid flowing into the mixing region via the feed connections, and an outlet connection, via which the fluid can flow out of the mixing region and out of the mixing cartridge;
- an actuation unit for actuating the mixing cartridge and
- a hose.

A first end of the pull-out hose is connected to the outlet connection and a second end thereof is arranged in a moveable manner on the housing. The hose extends through a channel of the mixing cartridge, the mixing region being arranged at least partially between the channel and the housing wall.

In particular, a fluid is mixed in the mixing cartridge for adjusting a predeterminable temperature. In particular, a flow rate can be adjusted (additionally) by means of the mixing cartridge. The temperature or flow rate is in particular adjusted by means of the actuation unit.

It is now proposed that the hose extends, starting from the first end (which is fluidically connected firmly to the fitting or to the outlet connection), through the mixing cartridge to the second end. The second end comprises in particular a fluid outlet.

In particular, a fluid can flow into the mixing region via the first feed connection and/or the second feed connection. The (possibly mixed) fluid can flow from the mixing region into the hose via the outlet connection. The fluid can exit the hose, in particular via a fluid outlet.

The provision of a mixing cartridge having a channel now enables the arrangement of the mixing cartridge inside the housing of the fitting, thus achieving a space-saving arrangement. The hose can thus be passed through the channel.

In particular, the housing wall (at least in the region of the mixing cartridge) and the channel are arranged coaxially to each other. In particular, the channel is therefore formed by an annular mixing cartridge, the channel being centrally arranged.

The mixing cartridge is designed to be fluid-tight with respect to the outside, such that a fluid flowing in via the feed connections can only flow out via the outlet connection.

In particular, the feed connections and the outlet connection are arranged adjacent to one another on a common diameter and in the circumferential direction. The channel is arranged inside the diameter. The channel, diameter and housing wall of the fitting are in particular arranged coaxially with one another.

In particular, the first feed connection is opened and closed by a first valve and the second feed connection is opened and closed by a second valve. A volumetric flow, which flows into the mixing region via the corresponding feed connection and from there into the (not closeable) outlet connection, can be adjusted by means of the valves. For example, a temperature of the fluid conducted via the mixing region can be adjusted by the interaction of both valves.

The mixing cartridge has in particular a plastic housing, thus making it possible to ensure that the mixing region is thermally insulated from the housing wall of the fitting.

In particular, at least one operating element, by means of which a fluid flow can be switched on and/or off, can be provided on the mixing cartridge or on the fitting. In particular, a volumetric flow or a temperature of the fluid is regulated by the actuation element in any case.

In particular, the first valve interacts with the actuation unit via a first actuation end and the second valve interacts with the actuation unit via a second actuation end.

In particular, the actuation unit is arranged adjacent to the mixing cartridge and the valves are actuated mechanically (i.e., as a result of a mechanical contacting, for example) by the actuation unit.

In particular, the actuation element has a link that can be turned with respect to the actuation ends, wherein as a result of a turning of the link in a circumferential direction, the actuation ends can be moved along an axial direction. In particular, the actuation ends and the link jointly form a sliding seat, thus enabling a relative movement between the link and the actuation ends along the circumferential direction.

In particular, the link extends annularly (i.e., along the circumferential direction in a closed manner) around a central opening, the hose extending (e.g., from the first end, through the channel and then) through the opening along the axial direction.

The link is in particular connected to a portion of the housing wall, such that a turning of the portion of the housing wall results in the link turning. In particular, an operator is thus able to actuate the link from outside the housing.

In particular, the actuation ends are arranged displaced toward the link by one corresponding spring each, thus ensuring an abutment of the actuation ends on the link. In particular, each spring is a compression spring, which can be pretensioned to varying degrees between a strongly pretensioned and a weakly pretensioned state when the link is turned. The permanent pretensioning ensures that the actuation ends are (always) in abutment on the link.

In particular, the actuation ends are arranged on a first end face, and the feed connections and the outlet connection are arranged on a second end face of the mixing cartridge opposite the first end face.

As a precaution, note that the number words ("first", "second", ...) used here chiefly (solely) serve as a means for differentiating among multiple similar objects, quantities or processes; in other words, they do not necessarily specify any dependency and/or sequence of these objects, quantities or processes in relation to one another. If a dependency and/or sequence is required, it is explicitly stated here or it is evident to a person skilled in the art when studying the specifically described design. If a component can occur more than once ("at least one"), the description of one of these components may, but does not necessarily have to, apply similarly to all or a portion of the majority of these components.

Figure 2:
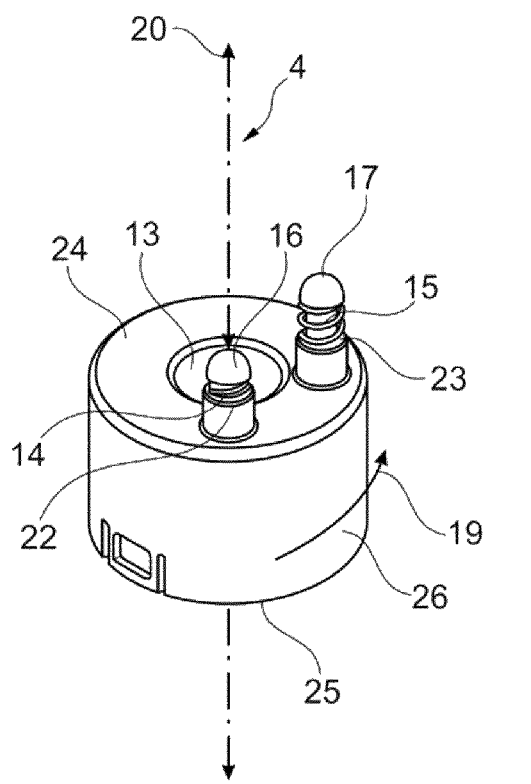
Figure 3:
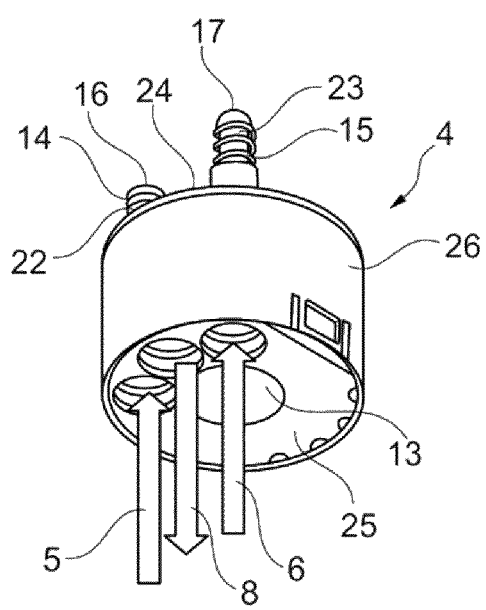
Figure 4:
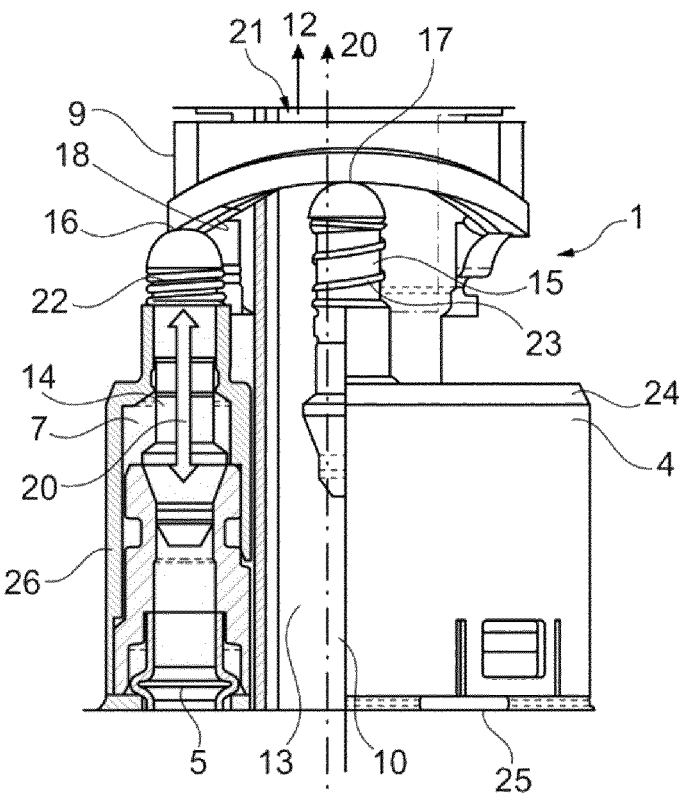
Figure 5:
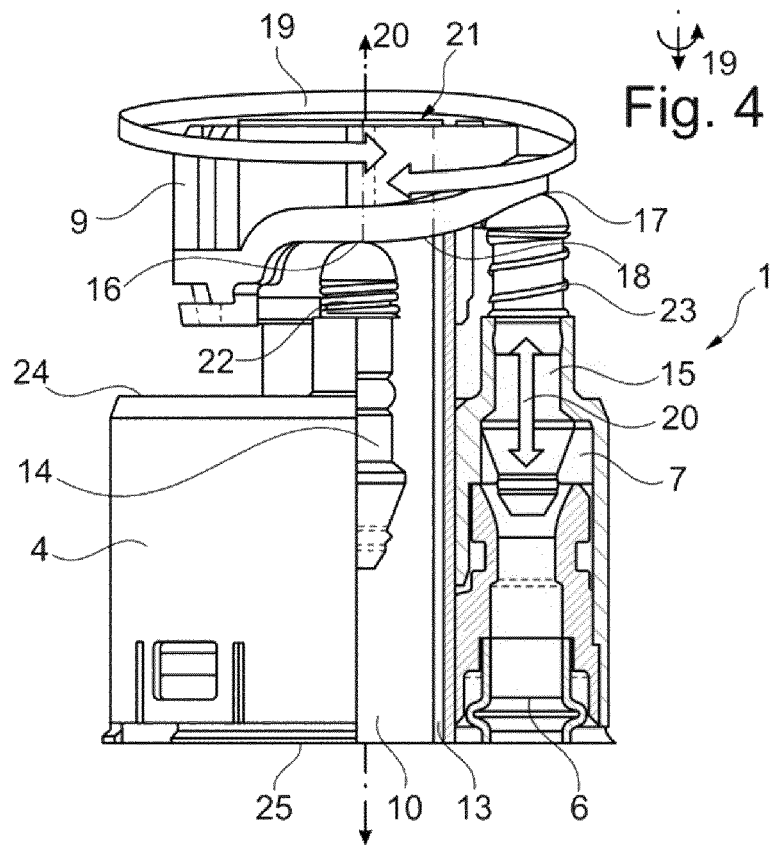
Figure 6:
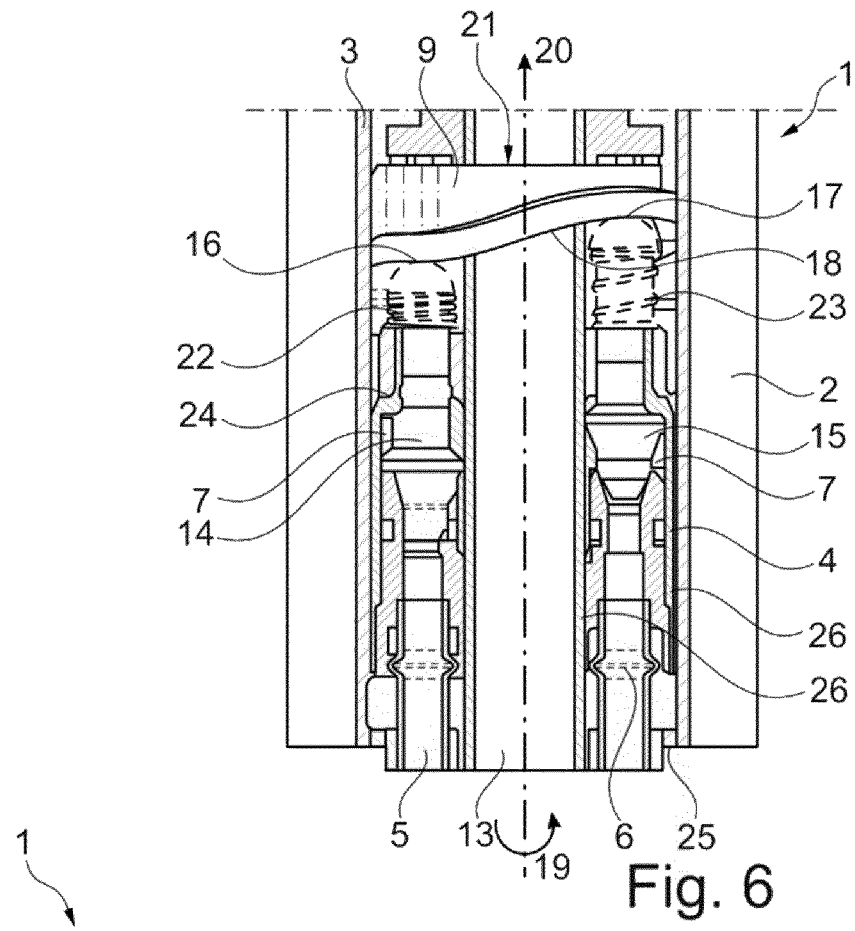
Figure 7:
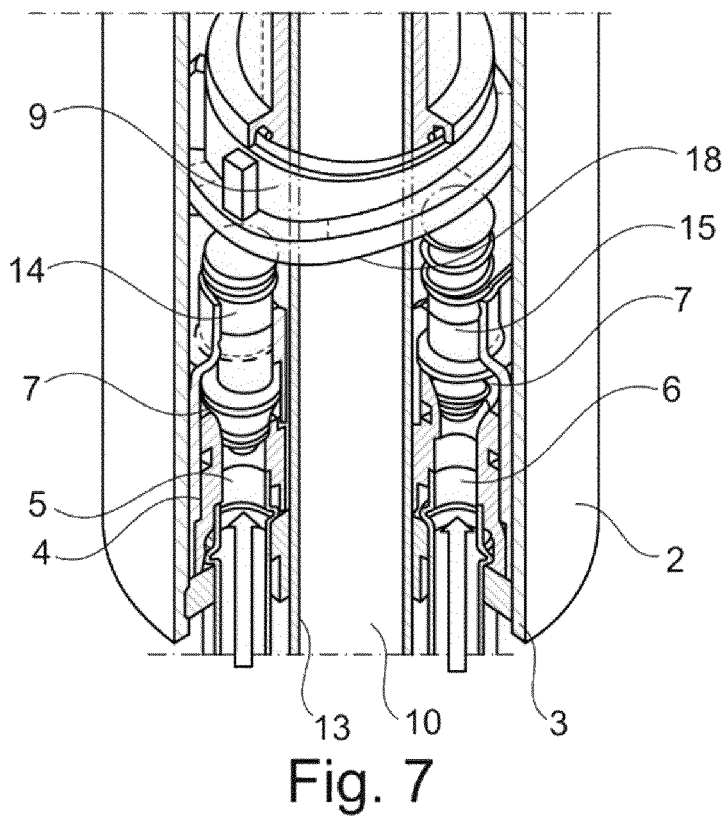
Figure 8:
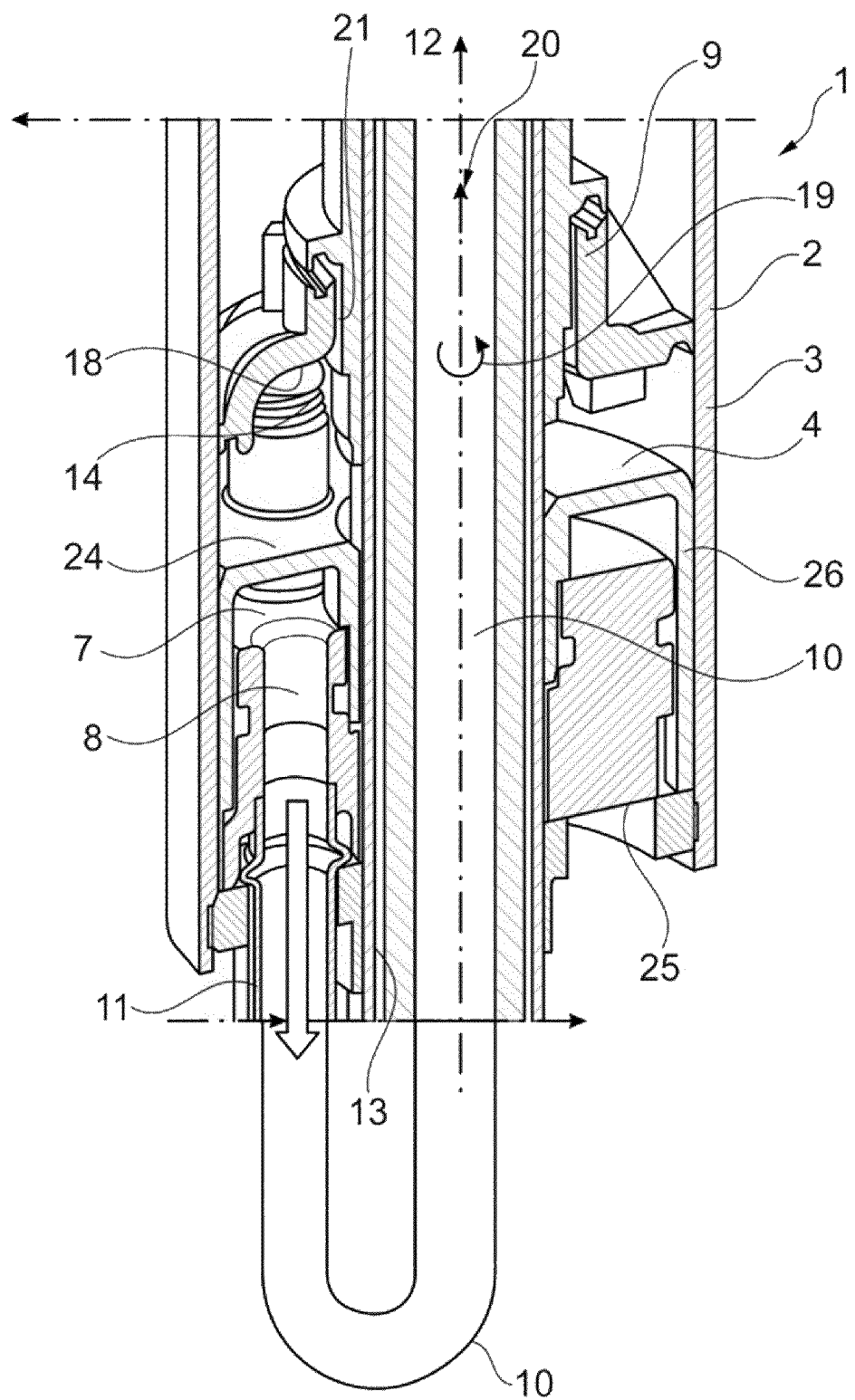

The invention and the technical environment are explained in more detail below, with reference to the appended figures. Note that the invention shall not be limited by the exemplary embodiments presented herein. In particular it is also possible, unless explicitly noted otherwise, to extract partial aspects of the facts explained in the figures and combine them with other components and findings from this description. In particular, it should be noted that the figures and in particular the proportions illustrated therein are merely schematic. In the Figures:

FIG. 1: is a lateral view of a fitting;

FIG. 2: is a first perspective view of a mixing cartridge;

FIG. 3: is the mixing cartridge according to FIG. 2 in a second perspective view;

FIG. 4: is a first detail of the fitting according to FIG. 1 in a lateral view in section;

FIG. 5: is a second detail of the fitting according to FIGS. 1 and 4 in a lateral view in section;

FIG. 6: is a third detail of the fitting according to FIGS. 1 and 4 and 5 in a lateral view in section;

FIG. 7: is the third detail according to FIG. 6 in a perspective view in section; and FIG. 8: is a fourth detail of the fitting according to FIGS. 1 and 4-7 in a lateral view in section.

FIG. 1 shows a lateral view of a (sanitary and/or pull-out) fitting 1. The fitting 1 is arranged on and fastened to a sanitary facility 27. The housing 2 of the fitting 1 is arranged on one side only of the sanitary facility 27. The feed connections 5, 6 and the outlet connection 8 of the mixing cartridge extend to the other side of the sanitary facility 27. The outlet connection 8 is connected to a first end 11 of a (pull-out) hose 10. The hose extends through the housing 2 of the fitting 1 to a second end 12, which is arranged in a moveable manner (capable of being pulled out and reinserted) on the housing 2. An actuation element 9 is arranged in the housing wall 3 of the housing 2, which can be used for adjusting a flow rate and a temperature of the fluid conveyed through the fitting 1. The actuation unit 9 can be turned in the circumferential direction 19 with respect to the housing 2.

FIG. 2 shows a mixing cartridge 4 in a first perspective view. FIG. 3 shows the mixing cartridge 4 according to FIG. 2 in a second perspective view. FIG. 4 shows a first detail of the fitting 1 according to FIG. 1 in a lateral view in section. FIG. 5 shows a second detail of the fitting 1 according to FIGS. 1 and 4 in a lateral view in section. FIG. 6 shows a third detail of the fitting 1 according to FIGS. 1 and 4 and 5 in a lateral view in section. FIG. 7 shows the third detail according to FIG. 6 in a perspective view in section. FIG. 8 shows a fourth detail of the fitting 1 according to FIGS. 1 and 4-7 in a lateral view in section.

FIGS. 2-8 are described together below.

The mixing cartridge 4 comprises a first feed connection 5, a second feed connection 6, a mixing region 7 (see FIG. 4, for example) for mixing a fluid flowing into the mixing region 7 via the feed connections 5, 6, and an outlet connection 8, via which the fluid can flow out of the mixing region 7 and out of the mixing cartridge 4. The first end 11 of the hose 10 is connected to the outlet connection 8. From the first end 11, the hose 10 extends through the channel 13 of the mixing cartridge 4, the mixing region 7 being disposed at least in part between the channel 13 and the housing wall 3.

The housing wall 3 (abuts the cartridge housing 26) and the channel 13 are arranged coaxially with each other. The channel 13 is formed by an annular mixing cartridge 4, the channel 13 being centrally arranged. The feed connections 5, 6 and the outlet connection 8 are arranged adjacent to one another on a common diameter and in the circumferential direction 19. The channel 13 is arranged inside the diameter. The channel 13, diameter and housing wall 3 of the fitting 1 are arranged coaxially with one another in the region of the mixing cartridge 4.

The first feed connection 5 is opened and closed by a first valve 14 and the second feed connection 6 is opened and closed by a second valve 15. The first valve 14 interacts with the actuation unit 9 via a first actuation end 16 (a hemispherical head) and the second valve 15 cooperates with the actuation unit 9 via a second actuation end 17. The actuation unit 9 is arranged adjacent to the mixing cartridge 4 and the valves 14, 15 are actuated mechanically by the actuation unit 9 (i.e., by the actuation ends 16, 17 mechanically contacting the link 18 of the actuation unit).

The actuation unit 9 has a link 18, which can be turned with respect to the actuation ends 16, 17, wherein as a result of a turning of the link 18 in a circumferential direction 19, the actuation ends 16, 17 and thus the valve bodies of the valves 14, 15 can be moved along an axial direction 20. The actuation ends 16, 17 and the link 18 jointly form a sliding seat such that a relative movement is enabled between the link 18 and the actuation ends 16, 17 along the circumferential direction 19.

The link 18 extends annularly (i.e., closed along the circumferential direction 19) around a central opening 21, the hose 10 extending from the first end 11, through the channel 13, and then through the opening 21 along the axial direction 20.

The link 18 is connected to a portion of the housing wall 3 such that a turning of the portion of the housing wall 3 results in a turning of the link 18. An operator is thus able to actuate the link 18 from outside the housing 2.

The first actuation end 16 is preloaded by a first spring 22 and the second actuation end 17 is pretensioned by a second spring 23 toward the link 18 and thus arranged displaced toward the link 18 such that an abutment of the actuation ends 16, 17 on the link 18 is ensured. The springs 22, 23 are designed as compression springs, which can be pretensioned to varying degrees between a strongly pretensioned and a weakly pretensioned state by turning the link 18. The permanent preloading ensures that the actuation ends 16, 17 permanently abut the link 18.

The actuation ends 16, 17 are arranged on a first end face 24 and the feed connections 5, 6 and the outlet connection 8 are arranged on a second end face 25 of the mixing cartridge 4 opposite the first end face 24.

LIST OF REFERENCE SYMBOLS

1 Fitting
2 Housing
3 Housing wall
4 Mixing cartridge
5 First feed connection
6 Second feed connection
7 Mixing region
8 Outlet connection
9 Actuation unit
10 Hose
11 First end
12 Second end
13 Channel
14 First valve
15 Second valve
16 First actuation end
17 Second actuation end
18 Link
19 Circumferential direction
20 Axial direction
21 Opening
22 First spring
23 Second spring
24 First end face
25 Second end face
26 Cartridge housing
27 Facility

The invention claimed is:

1. A fitting (1), comprising:
a housing (2) comprising a housing wall (3),
a mixing cartridge (4) arranged within the housing (2), the mixing cartridge (4) comprising:
  a first feed connection (5) opened and closed by a first valve (14), a second feed connection (6) opened and closed by a second valve (15), a mixing region (7) for mixing a fluid flowing into the mixing region (7) via the feed connections (5, 6), an outlet connection (8) through which the fluid can flow out of the mixing region (7) and out of the mixing cartridge (4), and a channel (13);
an actuation unit (9) for actuating the mixing cartridge (4), and
a hose (10);
  wherein the hose (10) is connected to the outlet connection (8) via a first end (11) and arranged in a moveable manner within the housing (2) via a second end (12); the hose (10) extends through the channel (13) of the mixing cartridge (4); and the mixing region (7) is arranged at least partially between the channel (13) and the housing wall (3).

2. The fitting (1) according to claim 1, wherein the housing wall (3), at least in a region of the mixing cartridge (4), and the channel (13), are arranged coaxially to each other.

3. The fitting (1) according to claim 1, wherein the first valve (14) cooperates with the actuation unit (9) via a first actuation end (16) and the second valve (15) cooperates with the actuation unit (9) via a second actuation end (17).

4. The fitting (1) according to claim 3, wherein the actuation unit (9) is arranged adjacent to the mixing cartridge (4) and the valves (14, 15) are actuated mechanically by the actuation unit (9).

5. The fitting (1) according to claim 3, wherein the actuation unit (9) has a link (18) capable of being turned with respect to the actuation ends (16, 17), wherein the actuation ends (16, 17) are moveable along an axial direction (20) as a result of a turning of the link (18) in a circumferential direction (19).

6. The fitting (1) according to claim 5, wherein the link (18) extends annularly around a central opening (21), wherein the hose (10) extends through the opening (21) along the axial direction (20).

7. The fitting (1) according to claim 5, wherein the link (18) is connected to a portion of the housing wall (3) such that a turning of the portion of the housing wall (3) results in a turning of the link (18).

8. The fitting (1) according to claim 5, wherein the actuation ends (16, 17) are each arranged so as to be shifted toward the link (18) by respective springs (22, 23) such that an abutment of the actuation ends (16, 17) on the link (18) is ensured.

9. The fitting (1) according to claim 3, wherein the actuation ends (16, 17) are arranged on a first end face (24) and the feed connections (5, 6) and the outlet connection (8) are arranged on a second end face (25) of the mixing cartridge (4) opposite the first end face (24).

* * * * *